FAULT RECORDER WITH DUAL MAGNETIC TAPES

Filed May 6, 1966 6 Sheets-Sheet 1

Inventor
Alexander Finlay
By Brown Jackson Boettcher & Dienner
Att'ys.

INVENTOR
ALEXANDER FINLAY
BY Brown Jackson Boettcher & Dienner
ATTYS.

March 26, 1968 A. FINLAY 3,375,526

FAULT RECORDER WITH DUAL MAGNETIC TAPES

Filed May 6, 1966 6 Sheets-Sheet 3

INVENTOR
ALEXANDER FINLAY

BY Brown Jackson Boettcher & Dienner
ATTYS.

March 26, 1968 A. FINLAY 3,375,526

FAULT RECORDER WITH DUAL MAGNETIC TAPES

Filed May 6, 1966 6 Sheets-Sheet 4

INVENTOR
ALEXANDER FINLAY

BY Brown Jackson Boettcher & Dienner

ATTYS.

March 26, 1968 A. FINLAY 3,375,526

FAULT RECORDER WITH DUAL MAGNETIC TAPES

Filed May 6, 1966 6 Sheets-Sheet 5

Inventor
Alexander Finlay
By Brown Jackson Boettcher & Dienner
Att'ys.

Inventor
Alexander Finlay
By Brown Jackson Boettcher & Dienner
att'ys.

United States Patent Office 3,375,526

Patented Mar. 26, 1968

3,375,526
FAULT RECORDER WITH DUAL MAGNETIC TAPES

Alexander Finlay, Springfield, Ill., assignor to Sangamo Electric Company, Springfield, Ill., a corporation of Delaware Filed May 6, 1966, Ser. No. 548,188
17 Claims. (Cl. 346—44)

The present invention relates to a device for effecting automatic continuous monitoring of predetermined conditions for extended time periods, and particularly to fault recorders for effecting the continuous monitoring and automatic recording of line fault conditions on power transmission or distribution lines.

There is a continuing requirement by utility companies in the field for equipment which automatically records disturbances, abnormalities or other fault types in a power distribution system. With such equipment installed at appropriate locations in the system, it is possible for parties skilled in the art to evaluate the information obtained and to convert such information into reliable and practical protective devices which minimize or eliminate the disturbances. The locations in the system at which the unit may be used are limited only by the economic justifications which must be satisfied both from an installation and evaluation cost standpoint. By way of limited example, in a power distribution system such equipment finds application at generator substations, transmission substations, subtransmission substations and certain distribution substations.

It is a specific object of the present invention to provide a novel fault recorder device which not only achieves recording of the disturbance, but additionally preserves the normal prefault and line conditions and the magnitude and time sequence of line conditions during a fault. More specifically, sensors are provided which continually supply information for recording which relate to undervoltage, undercurrent, overvoltage, or overcurrent conditions. Whenever a fault is detected by the sensors, the information obtained relating to the fault is recorded on a preassigned channel of a multichannel tape by FM techniques. Simultaneously, the novel circuitry of the system also initiates recording of a time-code signal on the tape.

According to another object of the invention a novel integral time-code generator is provided which generates time-information in the form of a pulse code which can be readily interpreted on playback to give the exact time of the fault. This code is generated continuously but is recorded only during fault conditions. On playback of the tape, a novel search circuit examines the time-code track to automatically locate the fault record on the magnetic tape, thereby simplifying the fault investigation efforts.

It is yet another object of the invention to provide a separate playback instrument which may be used to transcribe the recorded tape in such manner that the time base and amplitude of the information signal may be expanded or contracted on playback to assist in analysis of the fault. A patch panel allows for arranging of outputs for visual monitoring and analysis when the information is displayed on a recording oscillograph. In addition the playback machine can also effect amplitude control by use of an attenuator to assist in analyzing fault conditions.

It is a specific object of the invention to provide a dual magnetic tape recorder which includes two tapes and a control system for providing continual monitoring in a cyclic manner by the tapes, in alternate sequence, while yet not disturbing fault information which has been previously recorded thereon. That is, according to the invention, the novel control system is arranged so that one tape is always recording. When one path is within 10 to 15 seconds of exhausting its supply, the second tape path starts, providing an overlap period to insure that all information is recorded on one tape path if a fault occurs during this changeover period. Following the overlap period, the first tape automatically rewinds and the second path continues to record. When the second tape path exhausts its tape supply, the same sequence takes place to put the first tape path back in operation.

If a fault occurs, it is sensed by the control system, which in turn limits the rewinding of the recording tape path to a point 5 minutes past fault clearing. The machine continues to cycle until one tape path records a fault within five minutes of its end. When this happens, this path records to the end of its tape and then shuts down. The opposite tape path, however, continues to record. Since the first tape path is now out of service, when the second tape path comes to its end, the tape is rewound. Since the tape rewinds to a point five minutes post fault, the rewind time could vary from a few seconds if a fault were recorded slightly greater than five minutes from the end of the tape, to a maximum of three minutes for a clear reel. There is no recording during this rewind cycle. The second path continues to cycle in this manner until a fault is recorded within five minutes of its end. When this occurs, the machine shuts down.

In addition to recording prefault conditions, the present system includes as other unique features: (a) time expansion or contraction by increasing or decreasing playback speed to assist in analyzing fault records; (b) amplitude control by use of attenuator on the playback machine to assist in analyzing fault conditions; (c) a recording medium which can be transcribed many times, stored permanently, or reused, if desired.

Other objects, features and advantages of the recorder will become apparent from the following detailed description of one preferred embodiment thereof. In the accompanying drawings illustrating such embodiment:

*General description of system tape recorder*

Figure 1:
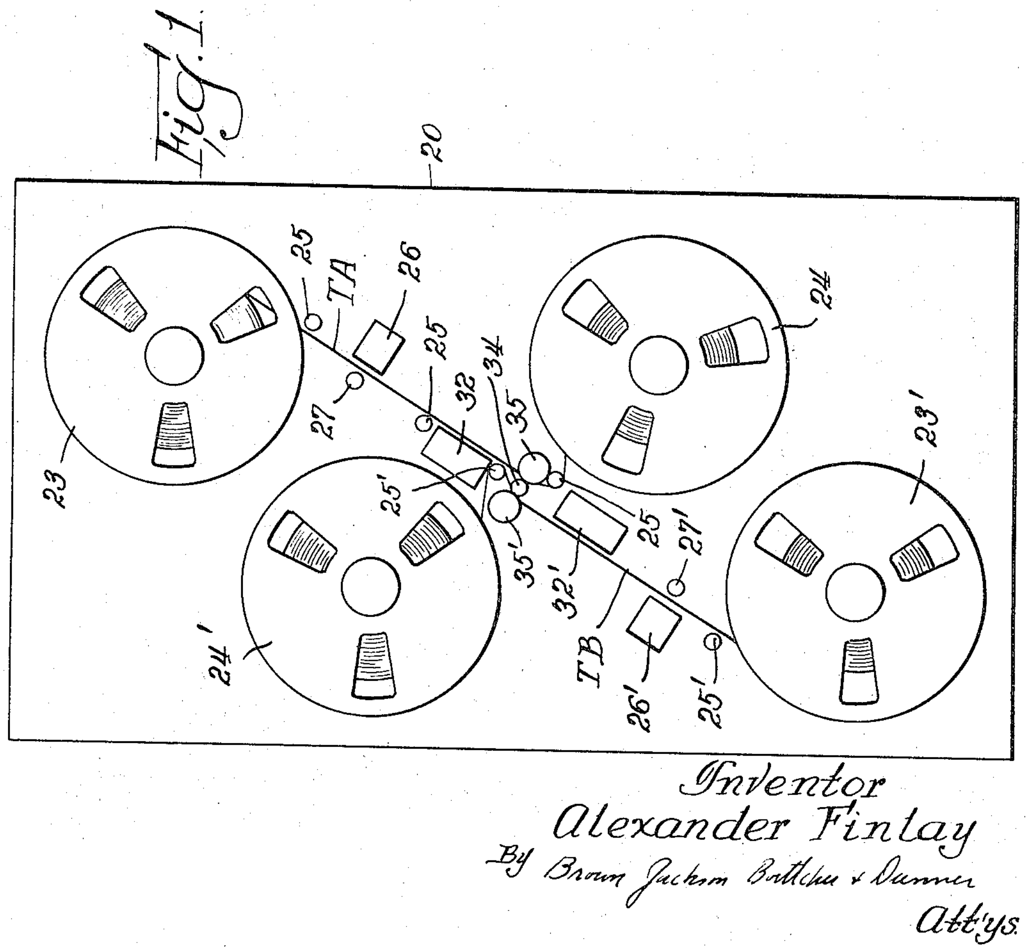
FIGURE 1 is a front elevational view of the vertical mounting deck or panel on which are mounted the supply and take-up reels for each of the two tapes.

With reference now to FIGURE 1, a vertical mounting panel or deck 20 supports the fault recorder mechanism.

Mounted on this panel 20 are a dual magnetic tape structure including a first unit comprised of the supply reel 23 and the take-up reel 24 for an upper magnetic tape, which has been designated TA, and just below the reels 23 and 24, a second unit comprised of supply reel 23' and the take-up reel 24' for a lower magnetic tape, which is designated TB. The tape in each case is preferably a heavy duty, instrumentation grade, hard surface, standard output, lubricated Mylar base tape, made up of .001" of Mylar and a thin iron oxide coating.

The path of the upper magnetic tape TA extends from the upper supply reel 23 and passes downwardly in guided engagement with guide posts 25 and thence passes in contact across a record head 32 which effects the magnetic recording of signal information on the tape; and further controls erasure of information as desired. The tape then passes between a driving capstan 34 and a pinch roll 35 which drives the tape at a constant velocity during the recording operation in a manner well known in the art. From the capstan and pinch roller, the tape passes over a further guidepost 25 to the take-up reel 24.

A photocell 26 and light source 27 are located along the tape run so that if the tape path is broken for any reason, or the tape records to the end, the photocell will sense the "no-tape" condition.

Substantially the same parts are provided for operating the lower tape TB, but these are in an inverted relation to accommodate the inverted relation of the two reels. For simplicity, these duplicate parts will be designated with the same reference numerals, but with a prime suffix added thereto.

Figure 2:
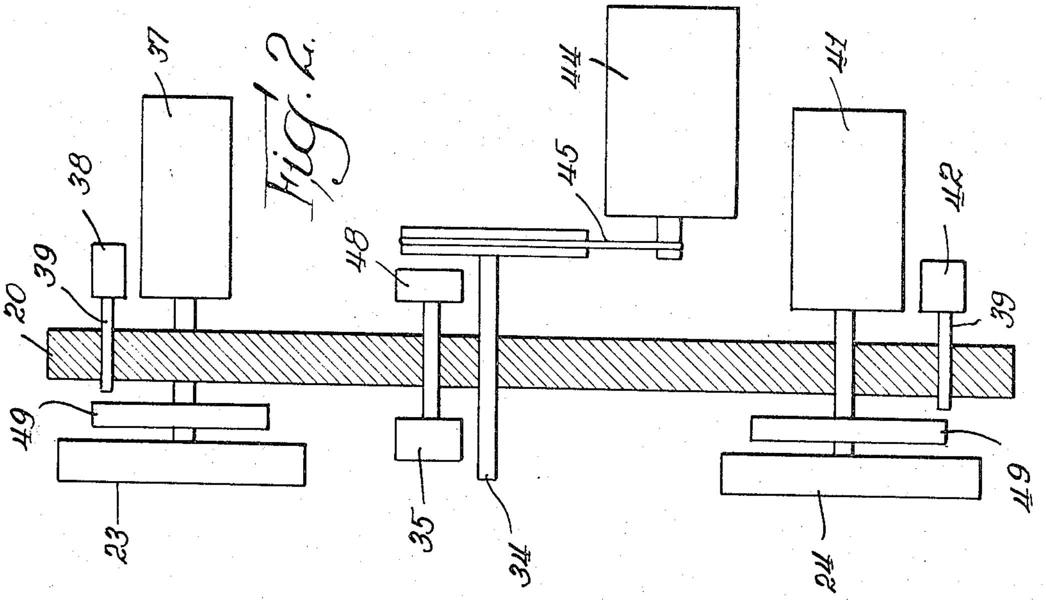
FIGURE 2 is a diagrammatic vertical sectional view through part of the deck or panel of FIGURE 1.

Referring now to the transverse sectional view of FIGURE 2, the supply reel 23 for the upper tape TA is adapted to be driven by the supply motor 37, and is adapted to be braked by the braking solenoid 38. In similar manner, the lower take-up reel 24 is adapted to be driven by the take-up motor 41, and is adapted to be braked by the braking solenoid 42. The capstan 34 is adapted to be driven by a capstan motor 44 driving through a belt drive 45. This effects a substantial speed reduction so that the tape will have a velocity of substantially 3¾ inches per second during the recording operation. A pinch solenoid 48 is provided for the pinch roller 35. Substantially the same operating relation of supply and take-up reels, brake solenoids, capstan and pinch roller are provided to operate the lower tape TB.

The supply and take-up reels, such as 23, 24 are driven by identical torque motors 37, 41, which serve to provide the required tape tension during recording, and power the rewind cycle. The motors are preferably of the capacitor run type. The capacitor in series with one of the windings makes the current in this winding out of phase with the curent in the other winding, thus providing a two-phase motor for smoother operation.

The motors are connected to supply torque in opposition to each other through the tape. Therefore, when they are both energized, the tape tension is determined by the motors and the amount of tape on the reel. Tension is preferably maintained at an average of 16 ounces throughout the recording cycle. The tape TA is moved throughout the recording cycle by the capstan 34, capstan motor 44 and pinch roller 35. The capstan motor 44 is preferably a hysteresis synchronous capacitor run motor. To initiate the movement of tape at record speed, the pinch roller solenoid 48 is energized, causing the pinch roller 35 to pinch the capstan 34 and pinch roller 35 together with the tape between them. The capstan motor 44 then accelerates the tape to 3¾ i.p.s.

When the tape TA is moved in the fast forward or fast reverse mode, the pinch roller solenoid 48 is retracted and the voltage reduced on the full reel torque motor, causing the torque of the full reel to be reduced. Full voltage is maintained on the empty reel, causing the tape to rewind. The full reel with reduced voltage tends to retard the tape flow and maintains the tape to a rewind speed of about 250 i.p.s. The transport automatically operates to rewind tape in this manner by operation of the fast forward switch.

Following the fast rewind cycle, the machine must come to a gentle stop by applying full voltage to the now-empty reel motor and completely removing voltage from the full-reel motor. The tape is thus brought to a gentle halt. After stopping, the motor shaft rotates a few degrees in the opposite direction releasing a pair of switches (not shown) by means of an eccentric cam which slips on the rear shaft of the take-up motor. The switches operate the control system to remove voltage from the supply motor and apply the mechanical holding brakes 38, 42.

Each of the holding brakes 38, 42 is a polyurethane-tipped solenoid plunger 39 which in all operating modes is retracted by the brake solenoid 38, 42. When the solenoid 38 is not energized, the solenoid plunger 39 is spring-loaded into contact with the reel backing plate 49. The brakes are used only to hold tape when in the stop mode, with the exception of the power failure, tape breakage, or when the tape is programmed to run to its end. In this case, the brakes are used to mechanically stop reel motion, thus providing a fail safe arrangement.

The recording head 32 consists of a magnetic core in the form of a closed ring having a short non-magnetic gap in series with the magnetic path of the core and a coil wound around the core, forming an electromagnet. The magnetic surface of the tape contacts the magnetic head at the gap, completing the magnetic path in the head core.

With current flowing in the coil, a flux $\phi$ is induced in the core, the magnitude of which is proportional to the recording current $i$. Since the tape is moving past the gap, any particle of a magnetic medium crossing the gap remains in a permanent state of magnetization proportional to the flux flowing through the head at the instant that particle passes out of the head gap.

The fault recorder is arranged to apply signals to thirty-two tracks on a one-inch wide magnetic tape by means of two 16-track heads interleaved. The 16-track cores and shields are imbedded in an aluminum alloy that has approximately the same wear characteristics as the core material, therefore, increasing the head life. By precisely controlling the mounting of the head on the record and playback machines, the recorded paths on the tape track properly in the playback mode.

Several basic recording techniques are now used in the art. If a fault signal were fed directly into the head, the recording process is considered a "direct recording." However, this process is not satisfactory for fault recorder application since the fidelity of the signal is greatly affected by drop-outs (tape being instantaneously lifted from the head due to imperfections in the tape) and the minimum information signal frequency is about 40 c.p.s. Accordingly in the present embodiment, frequency modulation techniques are used wherein the input (information signal) modulates or varies the frequency of a carrier signal in proportion to the amplitude of the information signal. Briefly, the information signal is amplified and fed to a modulator which consists of an oscillator (6,750 c.p.s.) the frequency of which can be varied from 4,045 c.p.s. to 9,450 c.p.s. in accordance with the amplitude of a signal fed to it from the amplifier. The output of the modulator is fed to a head driver circuit which supplies current to the head with a magnitude that induces flux in the tape sufficient to saturate the tape magnetically in a manner to be more fully described.

What has been described heretofore with respect to the upper tape TA also applies to the lower tape TB. As will be shown, the separate identical heads 32 and 32' for the respective tapes are connected in series so that both tapes receive the same information.

*General description of system circuitry*

Figure 3:
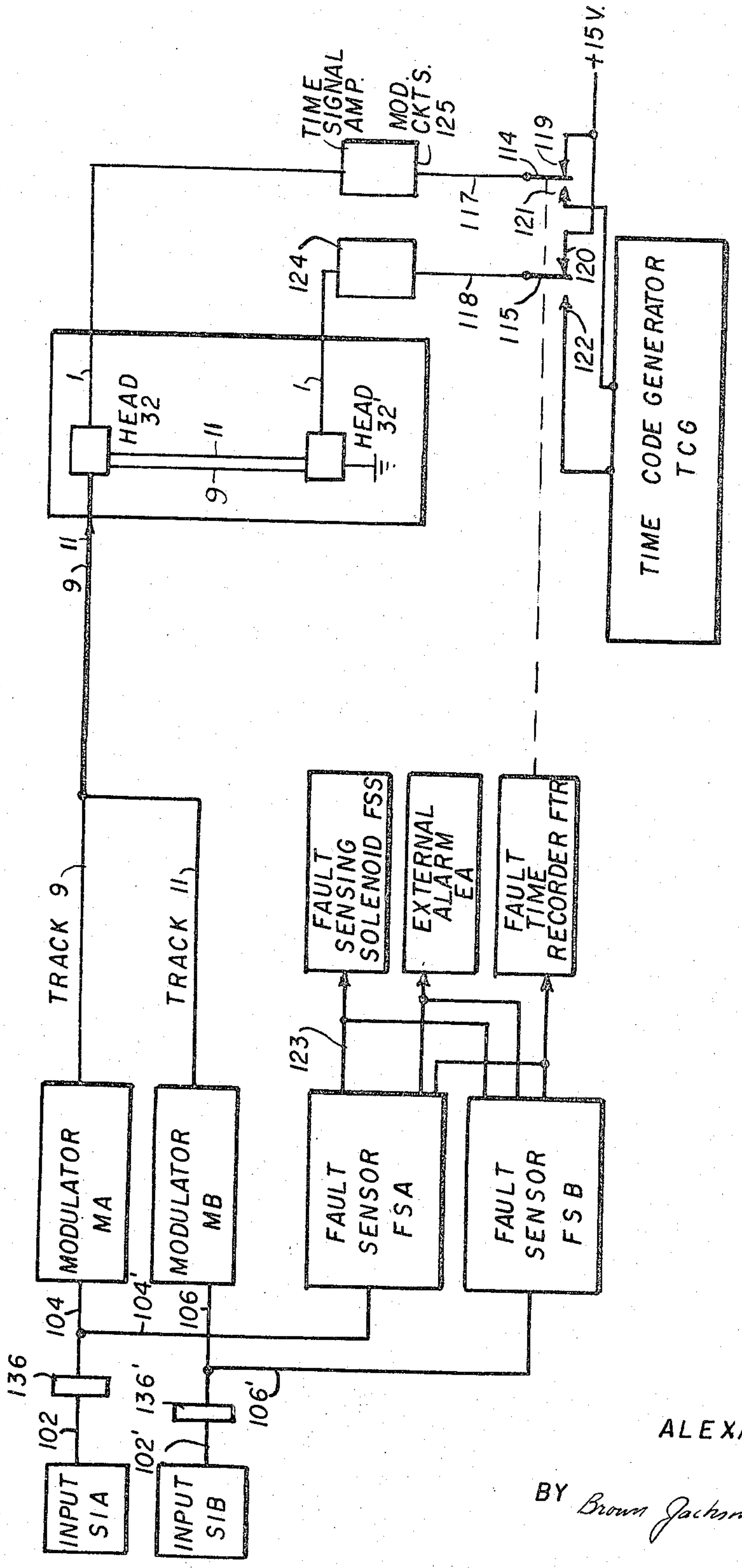
FIGURE 3 is a block diagram of the fault sensor and record circuitry of the system.

With reference to FIGURE 3, there is shown thereat in block form, the novel system for extending input signals representative of detected faults to the machine for recording by heads 32 and 32' on preassigned tracks on tapes TA and TB. As explained heretofore, when the machine is operating, one of the two tapes will be running at its normal speed of substantially 3.75 inches per second, and the other tape stands idle. A fault representative signal which might be provided over a first input circuit, such as illustrated circuit SIA, is transmitted over conductor 102 and an isolation stage 136 and conductor 104 to a modulator MA for recording by head 32 or 32' on track 9 of the effective one of the tapes, and is also connected over conductor 104' to a fault sensor FSA. Similarly, a fault representative signal which might be provided over a second input circuit SIB is transmitted over conductor 102' and an isolation stage 136' and conductor 106 to a modulator MB for recording by head 32 or 32' on track 11 of the effective one of the tapes, and is connected through conductors 106' to fault sensor FSB. By way of example, input circuit SIA may be connected to respond to over-voltage and under-voltage, and input circuit SIB may be connected to respond to over-current and under-current. As will be shown however other information inputs can be recorded by the system, and the disclosure is not to be considered limited in this regard. The specific manner in which the data signals for different types of faults may be recorded on the different tape tracks will be disclosed more fully hereinafter.

Each of the fault sensors FSA and FSB, as energized, as a result of a fault signal on its associated input circuit performs three functions, to wit: (*a*) energizes the fault sensing solenoid FSS; (*b*) energizes the external alarm EA; and (*c*) energizes the fault time recorder FTR.

The fault sensing solenoid FSS, as will be shown, is operative to control a mechanical device in the marking of the location of the recorded fault on the tape, and more specifically to mark the point of termination of each fault signal so that upon rewind the tape will be stopped approximately five minutes prior to arrival at the point of fault recording.

Briefly, the fault sensing solenoid FSS is maintained energized for the period of the fault detection and as the fault is cleared, the fault sensor solenoid releases to hold a mechanical marker in a position which limits rewind of the tape which recorded the fault to a point five minutes after fault clearing.

The fault time recorder FTR as energized is effective at contacts 115, 122; 114, 121 to provide signals representative of the day and time of day over conductors 118, 117 and over time signal amplitude and modulator circuits 124, 125 to heads 32, 32' for recording on track 1 of the effective tape for the period that the fault exists. (The effective tape is the one of the tapes which is being used at the time of fault occurrence.)

The external alarm EA, of course, provides the obvious function of notifying a local attendant that a detected fault is being recorded.

*Fault sensor circuit SIA*

Figure 4:
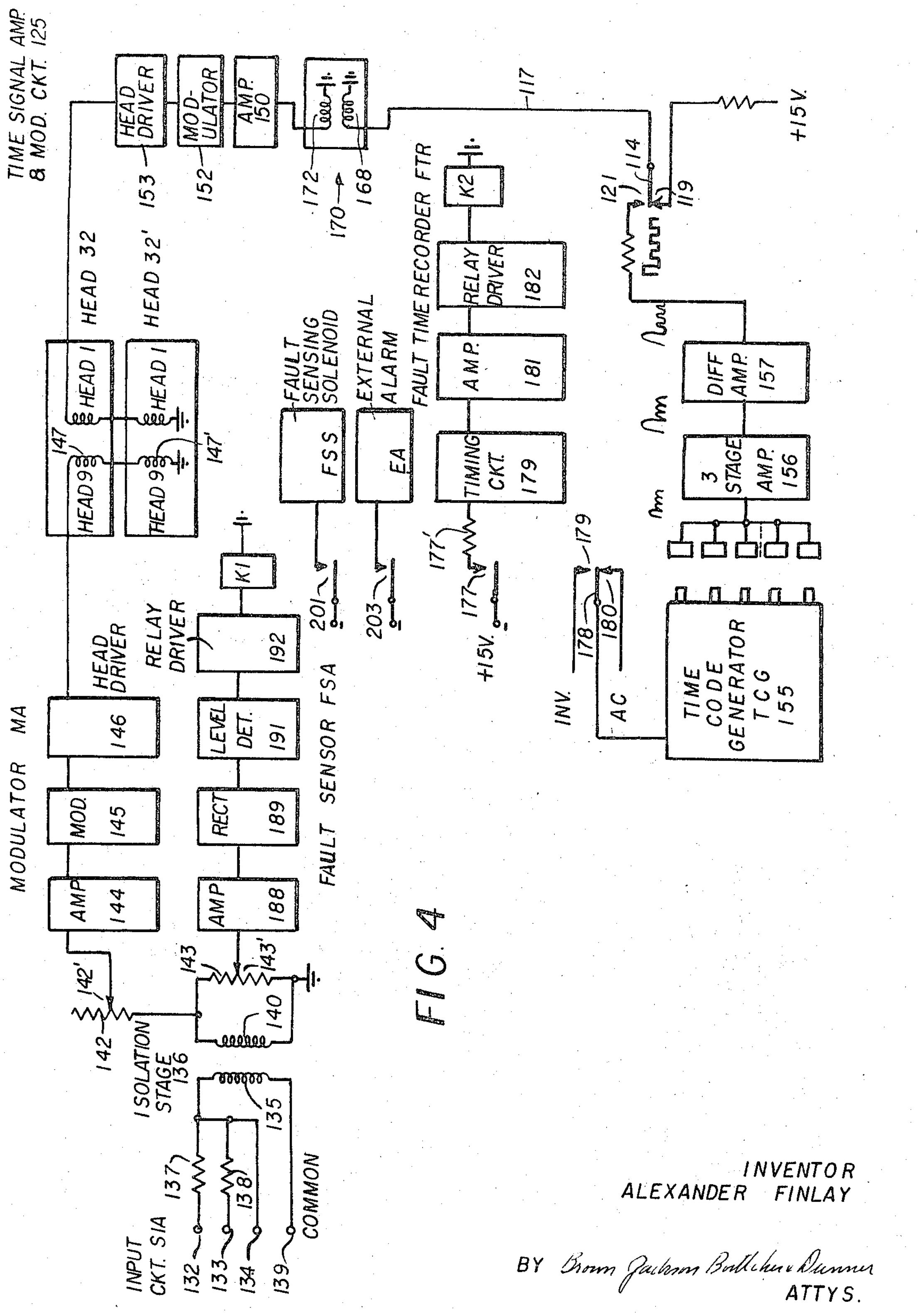
FIGURE 4 is a circuit diagram illustrating a fault sensor circuit for recording a fault on one channel of the tape and the fault time recorder circuit for effecting simultaneous recording of the fault time.

Referring now to FIGURE 4, the details of the circuitry for a representative one of the input circuits SIA, the fault sensor FSA, the fault time recorder FTR and time code generator TCG are illustrated thereat. The fault sensor circuit SIA (which is illustrative of other sensor input circuits used with the system) has input terminals 132, 133 and 134 connected with one end of the primary 135 of isolation stage transformer 136, the input terminals 132 and 133 being connected to the primary winding over resistors 137 and 138. The other end of the primary winding 135 is connected to a comon terminal 139. Input 132 is a potential input and inputs 133, 134 are current inputs.

If potential is to be recorded, the 120 volt secondary of a utility potential transformer is connected directly to the potential transformer terminal 132 and common terminal 139. The input impedance of this circuit is 5,600 ohms which presents a 3 volt ampere load to the utility potential transformer.

If the secondary of a curent transformer is to be monitored, inputs 133 or 134 are used. Thus input 133 is a 10:1 divider circuit and input 134 is fed directly into a 22 ohm resistance. The input to terminals 133, 134 must be fed from a 5 amp 50 mv. shunt. Terminal 133 is used if the anticipated maximum current to be recorded is greater than 20 times nameplate rating of the current transformer. Alternatively, the terminal 134 is used for current recording.

Since the amplitude of the information signal varies the signal frequency of the FM carrier signal, and the carrier signal must be kept within 40% of its center frequency, the maximum + signal level must be limited to a value which maintains the recording in the linear region.

The lower frequency limit as deteramined by the input transformers in the present embodiment is .25 to 6,000 c.p.s. and the recording bandwidth is .25 c.p.s. to 1,250 c.p.s. Normal practice is to limit the maximum signal frequency to ⅕ of the carrier center frequency to insure that the information signal can be separated from the carrier frequency.

The secondary winding 140 of the transformer 136 connects with variable tap resistors 142 and 143 and with ground. The variable resistor tap 142' is connected to transmit the information signal extended over secondary winding 140 through amplifier 144 to modulator 145. The modulator 145 is an oscillator (6,750 c.p.s.), the frequency of which can be varied from 4,045 c.p.s. to 9,450 c.p.s. in accordance with the amplitude of the signal input over circuit SIA and amplifier 144. In accordance with known FM techniques, the input signal modulates or varies the frequency of the carrier signal in proportion to the amplitude of the information signal. The resultant output signal of the modulator 145 is fed to the head driver circuit 146 which applies current to the head with a magnitude which induces flux in the tape sufficient to saturate the tape magnetically and thereby effect recording of the signal. The output of head driver 146 is shown connected to the recording means of head 32 for track 9 of tape A also to the recording means 147' of head 32' for track 9 of tape B.

The input information signal provided by the transformer secondary winding 140 is also fed over resistor tap 143' to the fault sensor circuit FSA which includes amplifier 188, rectifier 189, level detector 191 and relay driver 192 connected to the winding of relay K1. Amplifier circuit 188 and rectifier circuit 189 are conventional in nature and the level detector 191 is a Schmitt trigger circuit which is responsive to the rectified DC signal of the rectifier circuit 189 whenever a preset level is exceeded. Relay driver 192 may be a power transistor.

As a signal is received over input circuit SIA for recording on track 9 of the effective tape, transformer 136 and tap 143' also extend the signal over amplifier 188 to rectifier 189 to provide a DC signal which is proportional to the input signal. The resultant DC signal is applied to the signal level detector 191 which in turn provides a signal output whenever the signal exceeds a calibrated level. The resultant signal as applied to driver 192 effects operation of fault sensing relay K1.

If the system is to sense under voltage or under current conditions, the input sensitivity of the fault sensor circuit FSA is adjusted to drop out relay K1 when the condition occurs. If sensing of over voltage or overcurrent is desired, the fault sensor is adjusted so the relay K1 operates with the occurrence of such condition.

The relay K1 in its operation is effective at its contacts 177 to control the operation of fault time recorder FTR, at its contacts 201 controls operation of the fault sensing solenoid 202, at its contacts 203 controls operation of the external alarm 204, at its contacts 178, 180 interrupts the normal power supply to the fault time recorder FTR from the station AC source, and at its contacts 178, 179 connects an inverter output to the fault time recorder FTR.

The fault sensing solenoid FSS is held operated for the duration of the fault, and as the fault is terminated, restores to control a mechanical marker in a manner to be described to prevent re-use of the portion of the tape upon which the fault is recorded. The external alarm EA of course notifies the operator that a fault is being recorded.

Figure 5:
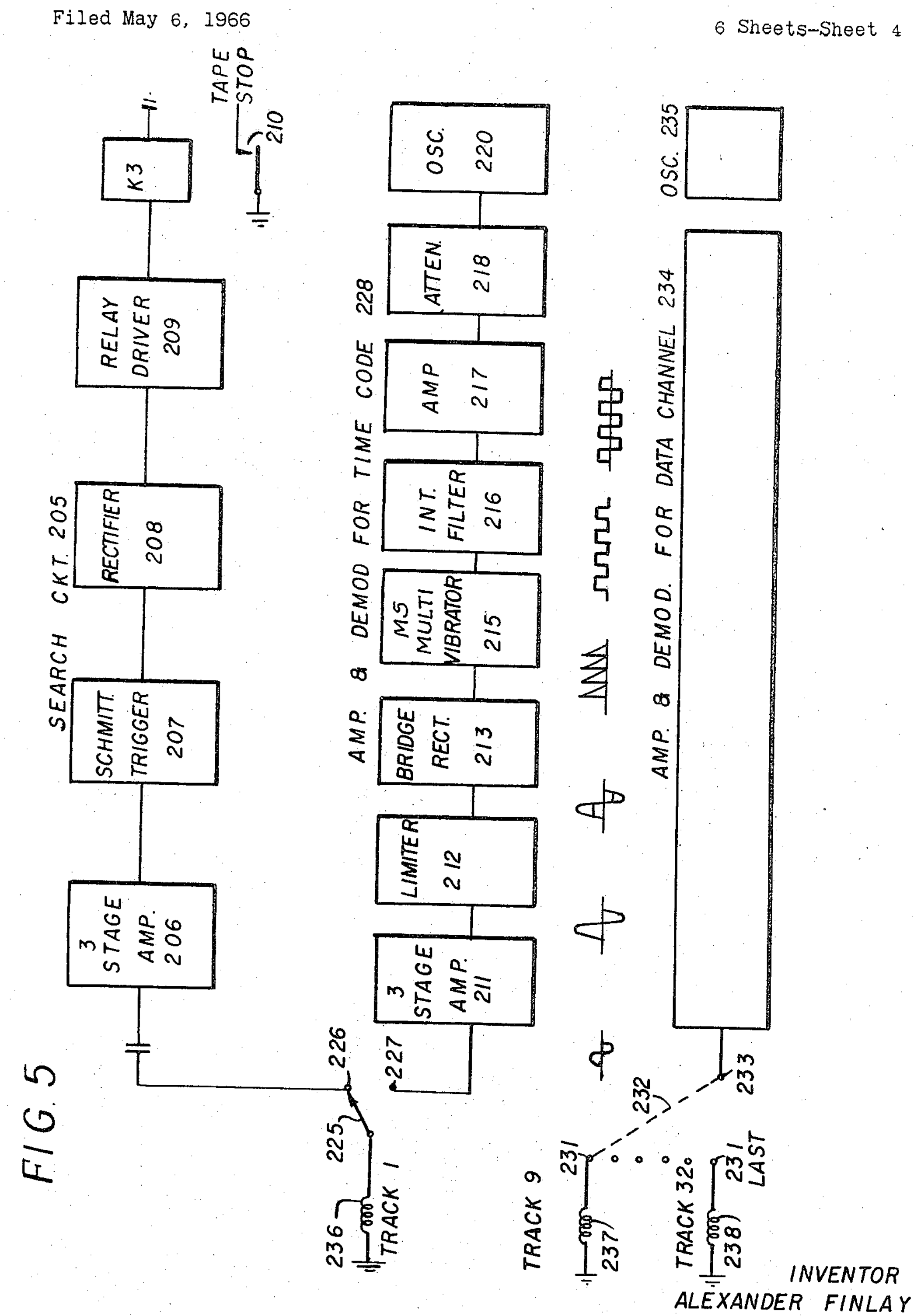
FIGURE 5 is a diagram of a search and playback circuit for the system.

The fault time recorder FTR as energized effects recording of the time of the fault. As shown in FIGURE 5 the fault time recorder is arranged to be energized from a +15 volt source over a circuit including contacts 177 and resistor 177′ which are connected to a timing circuit 179. The timing circuit 179 output is connected over amplifier 181 to relay drive 182 for relay K2. The timing circuit 179 has a time contact of 5 seconds and once energized holds voltage to the relay K2 for such period. As will be shown, this preset period of 5 seconds insures that five time codes will be recorded.

Relay K2 as normally deenergized at its contacts 115, 120 closes a circuit that supplies a 3 ma. DC current to the recording means for track 1 on heads 32, 32′ which saturates the time code track to erase any previous time code signals which may be recorded thereon. When relay K2 is operated, contacts 115, 120 are opened to remove the DC erase signal from the head tracks, and contacts 115, 122 are closed to connect the output of the fault time recorder FTR over a time signal amplifier and modulator circuit 125 circuitry to the heads 32, 32′ for recording on track 1 of the effective one of the tapes at the time. Since timing circuit 179 has a five second time constant, at least five output codes from the time code generator 155 will be recorded.

The time code generator TCG will be described in detail hereinafter. Briefly, however, the generator provides coded output signals which indicate time of week and time of day. The output pulses of the time code generator are amplified by a three stage amplifier 156 and are fed to a differential amplifier 157 including a pulse shaping network which provides square wave output pulses over contacts 115, 122 and circuits 125 to the recording means for heads 32, 32′.

The time signal amplifier and modulator circuitry 125 comprises an isolation transformer 170 having primary winding 168 selectively connected to the output of the time code generator TCG and a secondary winding 172 connected over amplifier 150, modulator 152 and head driver 153 to the recording means for track 1 on heads 32, 32′. The channel circuitry operates in the manner of components 144, 145, 146 to effect recording of the pulses in an FM mode. As will be shown, to interpret time from the code pulses recorded on the tape, it is only necessary to count the pulses.

In brief summary, it will be seen from the foregoing that sensing of a fault on one of the lines will result in the recording of such fault on one of the tape tracks by one of the heads 32, 32′. Additionally a time recording will be made on track 1 of the effective tape which establishes the time of the fault. Further the fault sensing solenoid FSS marks the location of the last fault by mechanical means. As the effective tape runs its length switch means automatically initiate operation of the other tape and after a predetermined delay, rewind of the first tape. As will be shown, during rewind, the first tape is stopped at some point five minutes prior to the last recorded fault so that the recorded information will not be disturbed.

*Search and playback circuit*

The search and playback circuit is illustrated in FIGURE 5. During the record process, the time code signal is recorded on a separate time recording track only during a fault condition. In playback, the object is to locate a recorded fault for the purpose of analyzing the recorded signals and to therefore locate the fault as quickly as possible.

The playback machine consists of a head, electronics, tape moving device, and power supply. The power source for the transport is 117 volt, 60 cycle AC. The playback transport is similar in many respects to the record machine but has only one tape path. It is capable of three-speed operation and has a rewind function under operator control as well as other features required for playback.

The playback heads are identical to the record heads; however, in playback, the recorded tape is moved past the head and induces a voltage in the head winding proportional to the recorded signal on the tape. The magnetized tape forms a shunt across the gap in the head, which causes flux from the magnetized tape to pass through the magnetic head structure. The flux in the head core induces a current in the head winding such as 236 (FIGURE 15). The output of the head winding is the input to a demodulator board.

More specifically, as shown in FIGURE 5, the search circuit 205 includes pickup means 236 for obtaining the signals from track 1 of the tape being examined. The tape that is brought in for analysis has been wound on the take-up reel. Therefore, the end of the tape is on the outside of the tape reel. For this reason, the filled reel must be put in the lower take-up reel position on the playback machine and threaded to the supply reel position.

As the tape moves in the forward direction at the speed selected, any signal on the time code track 1 will be fed to a three stage amplifier 206 for amplification and driving of a Schmitt trigger 207. When the preset signal level is exceeded, an output signal from the trigger 207 is rectified by rectifier 208 and applied to relay driver circuit 209 to effect operation of relay K3. As relay K3 operates, it is effective at its contacts 210 to complete a circuit for operating the tape stop switch (not shown) to bring the playback machine to a gentle stop.

At such time as a fault is located and the machine is stopped, the operator operates switch 225 to open contacts 226, whereby the signals on track 1 are no longer fed to the search channel, and further to close contacts 227 so that the time code signals on track 1 are fed to an amplifier and demodulation channel 228 for coupling to an oscilloscope 220 for visual observation. Briefly, the FM signal on track 1 is amplified by a 3-stage amplifier 211 and then applied to a limiter 212 which clips the signal and eliminates any amplitude modulation on the FM signal. (Imperfections in the tape, dirt, etc., can cause amplitude modulation.) The limiter circuit picks off only the center portion of the wave that is not affected by drop-outs and AM, and produces a constant amplitude square wave at the frequency of the modulated carrier. This square wave signal is AC coupled into a full wave rectifier 213, which doubles the frequency of the signal. This frequency doubling gives two advantages: (*a*) it approximately doubles the output of the demodulator for a given input signal, and (*b*) since the center frequency was also doubled, the unwanted center frequency is now 12,250 c.p.s. above the desired information signal insuring that the output filter completely segregates the carrier.

The pulses from the rectifier 213 drive a monostable multivibrator 215, the output of which is a square wave of a fixed time duration independent of the input amplitude. The signal is then fed into a low pass filter 216, which passes only the desired information signal. This is then passed through an amplifier 217 and an attenuator 218 to an oscilloscope 220 for observation purposes. The operator may now visually determine the time of week and time of day of occurence of the fault.

In a similar manner, the fault signal recorded on the different tracks, such as track 9, may be picked up by pickup means 237 for track 9 and coupled over its output terminal 231 and a path cord, such as 232, to an input terminal for an amplifier and demodulator channel 234 (which is identical to stage 228). The signals may then be visually observed on associated display equipment, such as oscilloscope 235.

The thirty-one output terminals 231–231 last for the information signals on the other thirty-one tape tracks may be connected to the inputs 233 of any one of a plurality of amplifier and demodulator channels, such as 234. The total number of such channels will vary but will normally be less than 32. The connections at any rate are not normally permanently cabled in, even on a machine with 32 channels of play-back since it may be advantageous to rearrange the output of the machine so that certain recorded signals may be placed next to other signals on the oscilloscope for analysis purposes.

*Tape following cam assembly*

Figures 6, 7, 8, 9:
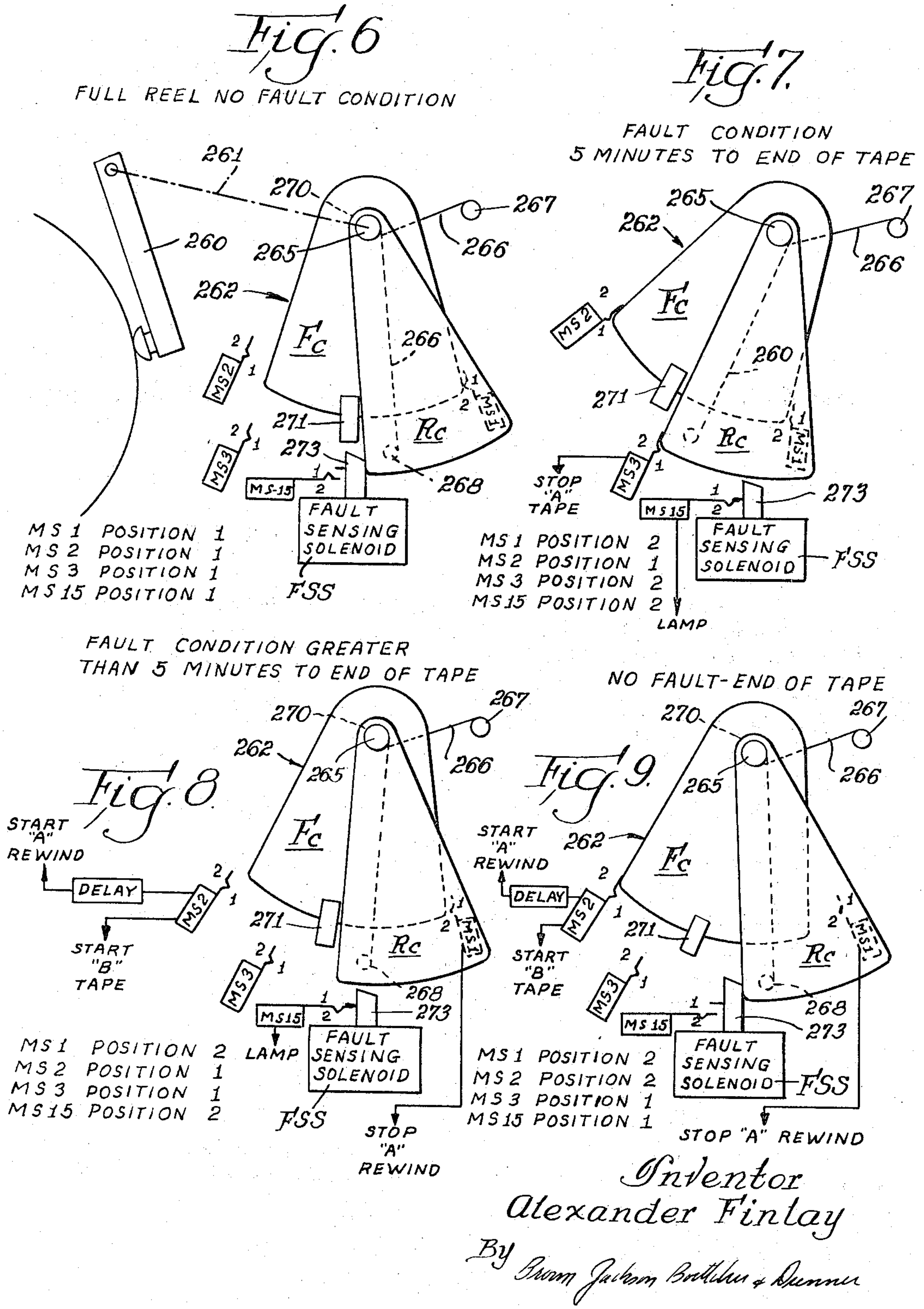
FIGURES 6, 7, 8 and 9 are front elevational views showing the tape-following cam assembly in different operating positions to achieve cycling of the tapes without loss of the recorded information.

As was noted hereinbefore, whenever a fault is recorded on one tape path, it is necessary to sense the location of the fault on the tape to limit the rewind of the tape short of the fault so that the recorded information is not disturbed. This is accomplished with the tape following cam assembly shown in FIGURES 6, 7, 8 and 9. Information is transmitted to the tape position cam from the tape following sensor arm 260. The sensor arm 260 is a spring-loaded arm located on the tape deck, which rides on the surface of the supply reel tape. This tape follower arm 260 ois solidly connected to the front cam FC of the tape and fault sensing cam assembly, such as through a shaft 261. This cam assembly will now be described in connection with FIGURES 6 to 9 inclusive. In these figures:

FIGURE 6 shows the full reel, no fault condition.

FIGURE 7 shows the fault condition, 5 minutes to the end of tape.

FIGURE 8 shows the fault condition greater than 5 minutes to end of tape.

FIGURE 9 shows no fault—end of tape.

This cam assembly 262 comprises front and rear segmental cams FC and RC both having concentric pivotal mounting on an upper pivot 265. A biasing spring 266 coiled on the pivot 265 has one end acting against a stationary pin 267 and has its other end acting against a stationary pin 267 and has its other end acting against a stud 268 projecting from the rear cam RC, thereby tending to maintain a clockwise bias on this rear cam. The tape follower arm 260 is solidly connected to the front cam FC at 270, so that as the magnetic tape is drawn out of the supply reel the front cam FC moves from the right to left, i.e., from the full reel position shown in FIGURE 6 to the end of tape position shown in FIGURE 9. If no fault has occurred during the operation fault sensing solenoid FSS holds cam RC in its original position (see FIGURES 6 and 9). In FIGURE 9 (200 feet before end of tape), switch MS–2 operates initiating a relay operation which starts the other tape of the pair of tapes in its movement. Assuming the illustrated mechanism is associated with tape A, the switch MS–2 will complete a circuit for effecting movement of tape B. Switch MS–2 also operates a 10–15 second time delay relay that initiates rewind of the exhausted tape A following the time delay.

A lug 271 projects rearwardly from the arcuate periphery of the front cam FC through the front housing wall of the tape track into position to be engaged by the left hand edge of the rear cam RC. A fault sensing solenoid FSS is located below both cams, and has a vertically movable tripping plunger 273. Normally, this tripping plunger 273 projects upwardly into a position to be encountered by the left hand edge of the rear cam RC (FIG. 6). When the solenoid FSS is energized this tripping plunger 273 is retracted downwardly into a position to clear the rear cam RC and thereby permit clockwise swinging movement of the rear cam RC into engagement with lug 271 on the front cam FC.

If no fault occurs, as noted above, the rear cam RC is held in the position shown in FIGURES 6 and 9, and as the tape is used, the front cam moves to the left to operate switch MS–2. As switch MS–2 operates, a circuit is completed to operate the second tape B, and after a 15 second delay tape A is stopped and automatic rewind is effected until the tape is entirely rewound.

*Fault detection*

When a fault is sensed by the fault sensor FSA, as described above, (*a*) the external alarm EA is operated, (*b*) the fault time recorder FTR effects recording of the fault time on the effective tape, and (*c*) the fault sensing solenoid FSS associated with the tape following cam assembly is operated. Assuming the fault occurs some time greater than 5 minutes from the end of the operating tape path, the fault sensing solenoid FSS plunger retracts, which allows rear cam RC to move to the left under spring pressure and stop against lug 271 on front cam FC (see FIGURE 8 for example). When solenoid plunger 273 retracts, the attached lug operates switch MS–15 to light the "fault-sensed" light on the front panel of the recorder corresponding to the recording tape path in use. Switch MS–15 maintains energization of the light until the tape sensing arm 260 is manually reset. When the fault is cleared, the fault sensing solenoid FSS is released and the tip end thereof functionally engages cam RC to hold the cam in its new position (i.e., the position shown in FIGURE 8 for example). The tape path continues to record until cam FC contacts switch MS–2, at which time the B tape is operated ,and after a given delay rewind of tape A is initiated. Since cam RC with switch MS–1 mounted on it has moved to the new position shown in FIGURE 8, the rear edge of cam FC will contact switch MS–1 when the reel is being rewound at a point 5 minutes after fault clearing. As switch MS–1 is closed, the energizing circuit for the rewind equipment is interrupted and rewind of tape A is terminated. The tape remains in this new position until called upon to operate by switch MS–2 associated with tape B when such tape has run its path. It then operates in the normal manner from the illustrated position (FIG. 8).

When the fault occurs less than five minutes from the end of the path, and the fault solenoid FSS is retracted, cam RC swings to the left as shown in FIGURE 7 and contacts cog or lug 271. Now the front cam has moved sufficiently far so that as rear cam RC swings to the left, switch MS–3 is closed which in turn operates a lockout relay (not shown), to interrupt the rewind circuit for tape A. The tape A now records until the tape is run entirely on to the take-up reel. Tape B now cycles in this manner until a fault is recorded within 5 minutes of its end, at which time the machine shuts down.

If the tape path should be broken for any reason, or the machine logic causes it to record to the end of the tape, a photocell 26 (FIGURE 1) senses the no-tape condition. When light falls on the photocell, a circuit is closed operating a relay (not shown) which locks out all operations on that tape path and releases the mechanical brakes 38, 42.

*Time code generator*

Figures 10, 11, 12, 13:
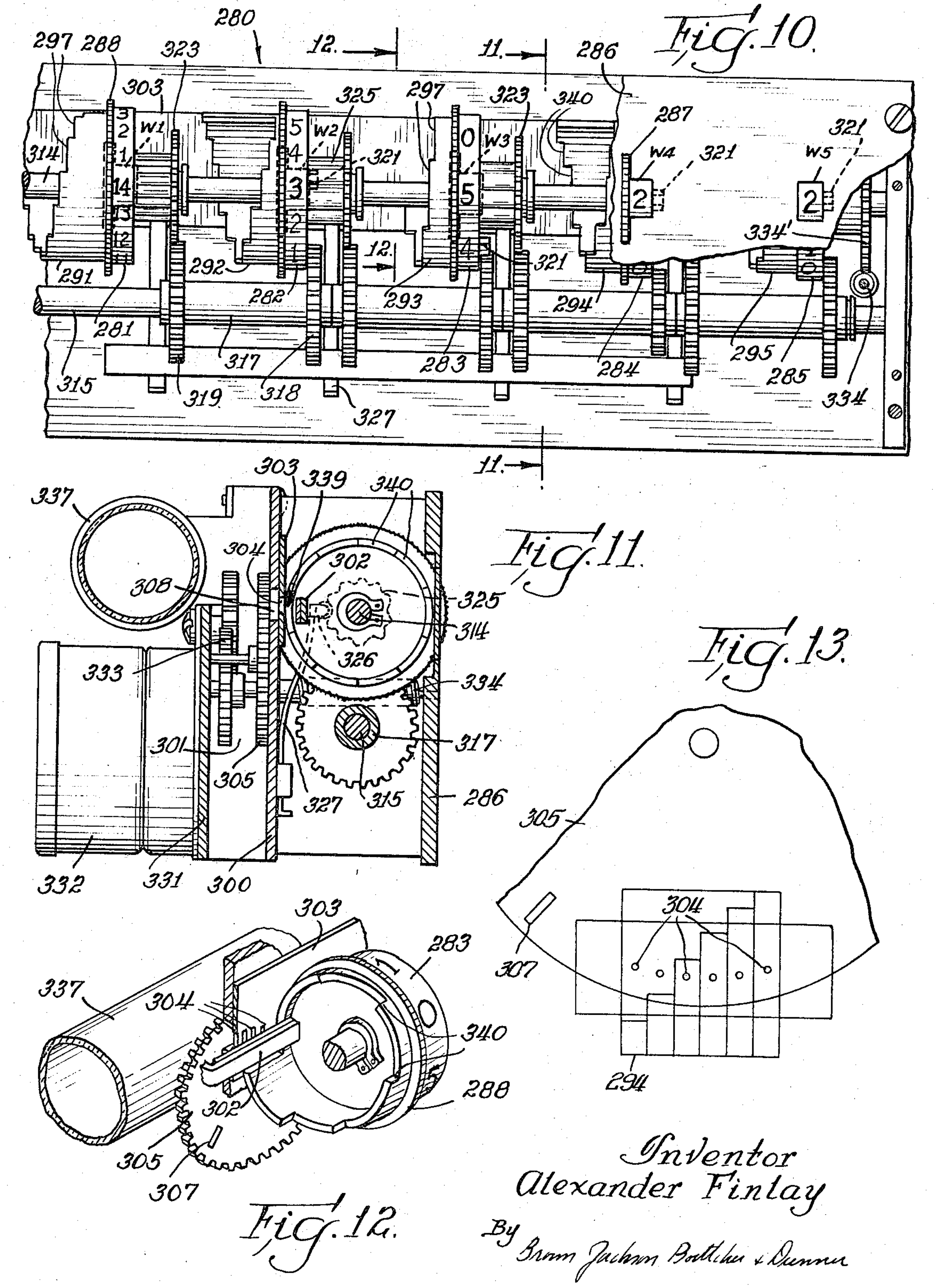
FIGURE 10 is a fragmentary front view, partly in elevation and partly in section, of the time code generator of the system.
FIGURE 11 is a transverse sectional view taken approximately on the plane of the line 11—11 of FIGURE 10.
FIGURE 12 is a sectional perspective view of one of the numeral wheels and its associated notched drum, together with the masking strip, the apertured disk, the light source and photoelectric cell.
FIGURE 13 is a schematic view diagrammatically showing the apertured disk, the marking strip, and the notched drums.

The time code generator 280, as shown in FIGURE 10, is a clock that can be read and set in the windows on the front of the recorder. There are five numeral wheels 281, 282, 283, 284 and 285 which are adapted to expose their front numerals at five sight windows *w*1 to *w*5 in a front sight panel 286 (FIGURE 10). Four of these windows *w*1 to *w*4 have slots 287 at their left hand edges for exposing knurled disks 288 by which the four numeral wheels 281-284 can be manually set. The five numeral wheels 281 to 285 expose the following time data at their respective sight windows *w*1 to *w*5:

Window *w*1—The week is divided into 14–12 hour periods. This window indicates ½ days from 1–14. 14 numerals.

Window *w*2—Indicates hours from 0–11. 11 numerals.

Window *w*3—Indicates 10ths of minutes from 0–5. 5 numerals.

Window *w*4—Indicates minutes 0–9. 9 numerals.

Window *w*5—Indicates 10ths of minutes from 0–9. 9 numerals.

Figure 14:
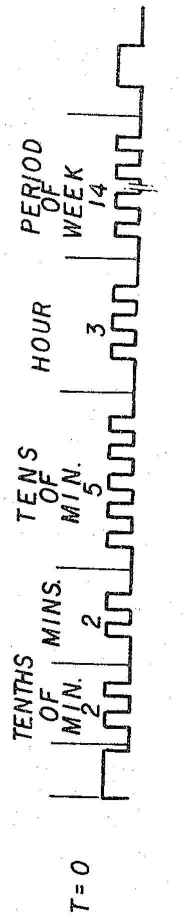
FIGURE 14 is a representative set of pulses which are readout as a time code.

The time code generator 280 is a combination mechanical and electronic device which generates time information in the form of a pulse code that can be readily interpreted on playback to give the exact time of the fault condition. The time information is continually generated but the code is recorded as described above only during fault condition. To interpret time from the code on the tape, it is only necessary to count pulses. A long pulse is recorded, indicating the start of a time code, and then 5 groups of pulses are recorded, indicating the same reading shown in the windows on the front of the recorder (see FIG. 14). Time is read from right to left, as the first group of pulses starting from left is tenth of seconds. The example shown would be (assuming Sunday a.m. as the first ½ day of the week) Saturday afternoon at 3:52 and 12 seconds.

The actual time code generator consists of 5 cylindrical drums 291, 292, 293, 294 and 295 projecting laterally, one from each of the numeral wheels 281–285 (FIGURE 10). Each of these drums is formed with steps or notches 297 in its projecting edge, corresponding in number to the highest numeral on the associated numeral wheel 281–285, and corresponding to the pulses to be recorded in each of the 5 code drum positions. The time code drums rotate at a speed dependent on the information to be generated. In other words, #291 drum rotates once in seven days, #292 drum rotates once in twelve hours, etc. A horizontal mounting panel 300 is disposed in rear of the numeral wheels 281–285 and notched drums 291–295.

The carry-over gearing for the drum comprises four sets of carry-over gears mounted on a countershaft 315 below the main shaft 314. Each set of carry-over gears comprises a sleeve 317 having at its right hand end a driving gear 318 and at its left hand end a driven gear 319. The right hand driving gears 318 are advanced intermittently by small segment gears 321 projecting from the right hand face of each of the numbered wheels 281–285. These segment gears range from two teeth to six or more teeth for transmitting different degrees of carry-over motion to their respective right hand driving gears 318. Each of the driven gears 319 meshes with another driven gear 323 secured to the right hand side of the associated number wheel 281–284.

A scalloped detent hub 325 joins each driven gear 323 to the numbered wheels 281–285, and snapping into and out of these scalloped depressions is a detent roller 326 having spring mounting on a leaf spring 327.

The five numeral wheels 281–285, together with their respective notched drums 291–295, are driven from a synchronous electric motor 332 (FIG. 11), as will be presently described. This motor is mounted on a horizontal sub-panel 331 secured to the rear side of the horizontal mounting panel 300 in spaced relation therefrom. Mounted in the space 301 between the panels 300 and 331 is a train of spur gearing 333 leading from the motor 332 to a forwardly extending worm 334 (FIG. 10) which transmits a drive through worm wheel 334' to the first numeral wheel 285. The succeeding numeral wheels 281–284 are driven from this first wheel at varying rates through the variable speed carry-over gearing, described above.

Located at the back side of the mounting panel 300 behind each of the notched drums 291–295 are five intergeared sampling wheels or coding disks 305 which are time driven together at a constant rate from the train of spur gearing 333. These sampling wheels all rotate at one revolution per second. Each sampling wheel has a slot 307 in it (the slots 307 being displaced relative to each other so that they are independently effective at successive times in a cycle), which registers with a relatively large opening 308 in the panel 300 and then scans across a mask 303 which is mounted on the panel 300 directly in back of the drums 291–295. This mask 303 is provided with five sets of light transmitting holes 304 corresponding to the position and number of steps on the particular code drum which is located just in front of each set of light transmitting holes 304. The series of light transmitting holes 304 in the five sets in the mask are arranged in arcs concentric with the circles of rotation of the sweep slots or holes 307 in the wheels 305.

A source of light 337, which is shown as a fluorescent tube, extends horizontally behind the five sampling wheels 305 so that light will be projected through the slots 307 in the wheels 305.

A photocell 302 is mounted inside each drum in the position shown in FIGURE 12. As the circular notched drums rotate in these narrow spaces, the notched edges 297 thereof rotate in an upward direction between the sets of apertures and the light sensitive rear surfaces of the photocell clips 302. As the notched steps 297 on the coded drums decrease in lateral depth in the forward rotation of the number wheels 281–285 they progressively expose more and more of the apertures 304 in each series. Thus, the light rays that are to reach the photoelectric cells 302 from the fluorescent tube 337 are subject to the notched steps 297 rotating with the coded drums, and are also subject to the sweeping motion of the small light transmitting holes 307 in the wheels 305 across the series of apertures 304.

More specifically when the fault time recorder FTR triggers the circuit to initiate the recording of a time code signal on the tape, the light rays from the fluorescent tube 337 pass through the triggering slot 307 in the first sampling wheel 305 associated with the time of week wheel 281 and thence pass successively through the first set of light transmitting holes 304 in the mask 303. There are fourteen holes in this first series of holes 304 in the mask. The number of light pulses that are able to pass through these holes 304 and reach the associated photocell 302 will depend upon the position of the notches 297 in the edge of the first cylindrical drum 291. Let us assume that the notched edge 297 passes light through all of the holes 304. Then the associated photocell 302 will respond with fourteen pulses for recording the day of the week on the tape. The slot hole 307 in the first sampling wheel 305 then passes out of registration with the first set of holes 304 in the mask 303.

Thereafter, the slot 307 in the second sampling disk starts registration with the second set of light transmitting holes in the mask 303, there being eleven holes in the second set corresponding to the twelve numerals on the second numeral wheel 282. The same general type of operation occurs in the case of the second set of mask holes, as described in the case of the first set of mask holes. The resulting effect will be that the pulsing of the second photocell associated with drum 292 will record on the tape the hour of the day (shown as 3 in the exemplary illustration of FIGURE 10).

The third numeral wheel 283 has six numerals on it, and there are five mask holes associated therewith. The fourth numeral wheel 284 has ten numerals on it and there are nine mask holes **304*a* associated with it, and correspondingly the fifth numeral wheel 285 has ten numerals on it and there are nine mask holes 304*e*** associated with it.

The same operation (in sequence) will occur with respect to the third, fourth and fifth sampling wheels to effect a readout of the numbers registered on wheels 283–285. Since the scanning apertures 307 are moved across each of the apertures 304 of a disk in sequence, the photocell will be energized in successive time periods to provide successive output pulses for the unblocked holes for a disk, the number of pulses corresponding to the number of holes which are unblocked (see FIGURE 14). Further, since the drum 291 is sampled first and then drum 292, etc., successive pulse sets are provided for the period of the week, hour, tens of minutes, etc., which result in a pulse transmission which identifies the time information on the device (see FIGURE 14).

Since the sampling wheels are rotating at a rate of one revolution per second, this coded transmitter repeats itself on a one second interval. The five photocells 302 (one in each drum) as previously mentioned, are connected in parallel (see FIGURE 4) to a solid state amplifier and pulse shaping network for selective connection to the effective tape by the fault time recorder FTR. Hence, a magnetic recording of the nature of the fault and the exact time thereof is made on the magnetic tape, which is then traveling between the tape supply reel and the tape pick-up reel in continuous readiness to receive fault signals thereon.

While only a particular embodiment of the invention has been disclosed and claimed, it is apparent that modifications and alterations may be made therein, and it is intended that the appended claims cover all such modifications and alterations as may fall within the true spirit and scope of the invention.

What is claimed is:

1. In a fault recording system for recording faults on electric power lines and the like, a first and a second magnetic tape, tape control means for continually enabling one of said tapes to record, a fault sensor for sensing faults on the electric power line including means for transmitting said fault to the effective one of said tapes for recording thereon, marking means for marking the location of the fault on said tape, fault sensing means responsive to said fault sensor to operate said marking means, a time code generator for providing coded signals representing at least the time of day, and fault time recorder means responsive to said fault sensor for enabling said generator means to provide the coded signals to the effective one of said tapes whenever a fault is being recorded.

2. A system as set forth in claim 1 in which said tape control means includes means for simultaneously operating both tapes at the time one of the tapes is near the end of its travel.

3. A system as set forth in claim 1 in which said tape control means includes means operative as said one tape nears the end of its travel to enable the other of said tapes and thereafter to initiate rewind of said one tape, and switch means controlled by said marking means to terminate said rewind of said one tape prior to reaching the location of the recorded fault on said one tape.

4. In a recorder device for continuously monitoring an electrical circuit for predetermined conditions over extended periods of time, the combination of two recording tapes, sensing means for sensing the occurrence of said predetermined conditions in said electrical circuit, recording means connected to said sensing means, and means for operating one of said tapes along a path related to said recording means to record said conditions as sensed by said sensing means, and means for enabling the other one of said tapes responsive to advance of said one tape toward the end of its travel, including means for thereafter disabling said one tape, whereby at least one of said tapes is continually operative to record the sensed conditions.

5. In a fault recording system for recording faults on electric power lines and the like, the combination of a first and a second magnetic tape, a supply reel and a take-up reel for each of said tapes, sensing means for sensing faults on the electric power line, means including recording means for recording said faults on said magnetic tapes as provided by said sensing means, and a first means for selectively causing said first tape to move through a recording path of travel from its supply reel to its take-up reel, and a second means for enabling the second tape to start on its recording path of travel from its supply reel to its take-up reel prior to the end of travel of the first tape from its supply reel to its take-up reel, and thereafter to automatically effect rewind of said first tape.

6. A fault recording system as set forth in claim 5, which includes time code generator means, and means operative responsive to detection of a fault by said sensing means to record the time of the fault on the effective one of said tapes as provided by said time code generator means.

7. A fault recorder as set forth in claim 5 which includes playback means having signal pick-up means, and search means connected to said pick-up means for locating a time code on the tape during the playback operation.

8. A fault recorder as set forth in claim 5 which includes first and second cams for each tape mounted for interacting movement, at least one of which cams for said first tape being operative to operate said second means to initiate movement of said second tape, and tape sensing means responsive to a predetermined reduced amount of said first tape on its supply reel for adjusting said one cam to operate said second means.

9. A fault recording system as set forth in claim 5 which further includes marking means operable to register recording of a fault at different locations on said tape, and a fault sensing solenoid responsive to a fault condition for enabling said marking means to operate to the position which marks such location, and responsive to clearing of the fault to lock said marking means in said position until a further fault is sensed.

10. In a fault recording system for recording faults on electric power lines and the like, the combination of a first and a second magnetic tape, a supply reel and a take-up reel for each of said tapes, sensing means for sensing faults on the electric power line, means including recording means for recording said faults on said magnetic tapes as provided by said sensing means, and a first means for selectively causing said first tape to move through a recording path of travel from its supply reel to its take-up reel, and a second means enabling the second tape to start on its recording path of travel from its supply reel to its take-up reel prior to the end of travel of the first tape from its supply reel to its take-up reel, including indicator means operable to indicate the amount of said first tape which has been used in the recording, marker means controlled by said indicator means to register the location of recording of a fault on said first tape, and means controlled by said indicator means and said marker means during rewind of said first tape to terminate rewind of said tape prior to arrival at the location of fault recording on said first tape.

11. In a fault recording system for recording faults on electric power lines and the like, the combination of a first and a second magnetic tape, a supply reel and a take-up reel for each of said tapes, sensing means for sensing faults on the electric power line, means including recording means for recording said faults on said magnetic tapes as provided by said sensing means, and a first means for selectively causing said first tape to move through a recording path of travel from its supply reel to its take-up reel, and a second means enabling the second tape to start on its recording path of travel from its supply reel to its take-up reel prior to the end of travel of the first tape from its supply reel to its take-up reel, including indicator means operable to indicate the amount of said first tape which has been used in the recording, marker means controlled by said indicator means to register the location of recording of a fault on said first tape, and means controlled by said marker means to terminate further use of said first tape responsive to sensing of a fault after a predetermined portion of said first tape is used.

12. In a fault recording system of the class described, the combination of two magnetic tapes, a supply reel and a take-up reel for each of said tapes, sensing means for sensing predetermined conditions in an electrical circuit, recording means for recording the sensed conditions on said tapes, and control apparatus for controlling movement of said tapes comprising two concentrically swinging cams, spring means establishing a spring bias on one of said cams, a fault sensing solenoid having a plunger normally holding said one cam against said spring bias, a tape sensing arm responding to the amount of tape that remains wound on one of said reels, means connecting said tape sensing arm with the other of said cams for causing movement of said other cam with decrease in the amount of tape on said reel, and control switch means responsive to movement of said other cam to a predetermined position of reduced tape on its supply reel to initiate movement of the other tape.

13. A fault recording system as set forth in claim 12 which includes stop means on said other cam for limiting movement of said one cam whenever said fault sensing solenoid is operated to release said one came for movement by said spring means, said plunger being operative upon release of said solenoid to hold said one cam in its new position, and switch means positioned by said one cam to limit rewind of said tapes to a position in advance of the recorded fault.

14. In a fault recording system for monitoring predetermined conditions of an electrical circuit, the combination of magnetic tape means, sensing means for sensing certain predetermined conditions in said circuit, recording means for recording signals indicating the nature of said conditions on said magnetic tape means, time code generator means for generating time code signals which are recorded on said tape concurrently with the recording of said condition thereon, said time code generator comprising an opaque panel, a series of light transmitting apertures extending therethrough, a source of light on one side of said panel, a plurality of time driven disks on said one side of said panel, each having a scanning area operable to sequentially register with each of its associated light transmitting apertures and to vary the light intensity to said aperture during registration therewith, a plurality of time driven drums on the other side of said panel, photocells located within said drums, and means moved by said drums for closing off passage of light from said light transmitting apertures in said panel to said photocells in different combinations to represent correspondingly different digits.

15. The combination recited in claim 14 wherein said time code generator comprises means for rotating one of said time driven drums at a predetermined rate, and carry-over mechanism for transmitting motion from said drum to the next adjacent drum after each complete revolution thereof.

16. The combination recited in claim 14 which includes means for controlling said time driven disks to effect readout of the digits registered by their associated drums in a predetermined sequence.

17. In a fault recording system for monitoring predetermined conditions of an electrical circuit, the combination of magnetic tape means, sensing means for sensing certain predetermined conditions in said circuit, recording means for recording signals indicating the nature of said conditions on said magnetic tape means, time code generator means for generating time code signals which are recorded on said tape concurrently with the recording of said condition thereon, said time code generator comprising an opaque panel, a series of light transmitting apertures extending therethrough, a source of light on one side of said panel, at least one time driven disk on one side of said panel having a scanning area operable to sequentially register with each of its associated light transmitting apertures and to vary the light intensity to said aperture during registration therewith, a time driven drum on the other side of said panel, photocells located within said drum, and means moved by said drum for closing off passage of light from said light transmitting apertures in said panel to said photocells in different combinations to represent correspondingly different digits.

References Cited

UNITED STATES PATENTS 3,295,853 1/1967 Teh Yuan Cheng ----- 274—11

RICHARD B. WILKINSON, *Primary Examiner.*

JOSEPH W. HARTARY, *Assistant Examiner.*